United States Patent
Venkataraman et al.

(10) Patent No.: US 12,262,314 B2
(45) Date of Patent: Mar. 25, 2025

(54) NETWORK SLICE AWARE CELL SELECTION

(71) Applicant: Apple Inc., Cupertino, CA (US)

(72) Inventors: Vijay Venkataraman, San Jose, CA (US); Alosious Pradeep Prabhakar, Singapore (SG); Cahya A. Masputra, San Jose, CA (US); Haijing Hu, Los Gatos, CA (US); Krisztian Kiss, Hayward, CA (US); Longda Xing, San Jose, CA (US); Srinivasan Nimmala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 17/593,794

(22) PCT Filed: Feb. 12, 2020

(86) PCT No.: PCT/CN2020/074883
§ 371 (c)(1),
(2) Date: Sep. 24, 2021

(87) PCT Pub. No.: WO2021/159307
PCT Pub. Date: Aug. 19, 2021

(65) Prior Publication Data
US 2022/0377659 A1    Nov. 24, 2022

(51) Int. Cl.
*H04W 48/20* (2009.01)
*H04L 5/00* (2006.01)
*H04W 48/12* (2009.01)
*H04W 72/0453* (2023.01)
*H04W 72/23* (2023.01)

(52) U.S. Cl.
CPC ........... *H04W 48/20* (2013.01); *H04L 5/0048* (2013.01); *H04W 48/12* (2013.01); *H04W 72/0453* (2013.01); *H04W 72/23* (2023.01)

(58) Field of Classification Search
None
See application file for complete search history.

(56) References Cited

U.S. PATENT DOCUMENTS

| | | |
|---|---|---|
| 2018/0192445 A1 | 7/2018 | Jiang |
| 2018/0288654 A1 | 10/2018 | Shih et al. |
| 2018/0352491 A1 | 12/2018 | Shih et al. |
| 2019/0014515 A1* | 1/2019 | Zee .................. H04W 36/0027 |
| 2019/0028941 A1 | 1/2019 | Zee et al. |

(Continued)

FOREIGN PATENT DOCUMENTS

| | | |
|---|---|---|
| CN | 106851589 | 6/2017 |
| CN | 108366365 | 8/2018 |

(Continued)

*Primary Examiner* — Srinivasa R Reddivalam
(74) *Attorney, Agent, or Firm* — Fay Kaplun & Marcin, LLP

(57) ABSTRACT

The exemplary embodiments relate to implementing network slice aware cell selection at a user equipment (UE). This may include receiving information indicating that a cell of a network supports a network slice. The UE may identify that the UE is located within the coverage area of the cell and determine whether measurement data corresponding to the cell satisfies predetermined criteria. when the measurement data satisfies the criteria, the UE may camp on the cell.

14 Claims, 4 Drawing Sheets

(56) References Cited

U.S. PATENT DOCUMENTS

| | | | |
|---|---|---|---|
| 2019/0289528 A1 | 9/2019 | Lou et al. | |
| 2019/0327657 A1 | 10/2019 | Han et al. | |
| 2019/0349838 A1* | 11/2019 | Futaki | H04W 74/002 |
| 2020/0053083 A1* | 2/2020 | Kunz | H04L 63/0892 |
| 2020/0120547 A1* | 4/2020 | Han | H04W 36/24 |
| 2020/0322879 A1 | 10/2020 | Zhu et al. | |
| 2022/0248318 A1* | 8/2022 | Qiao | H04W 60/04 |
| 2022/0264444 A1* | 8/2022 | Ryu | H04W 76/18 |
| 2023/0013720 A1* | 1/2023 | Gupta | H04W 12/08 |

FOREIGN PATENT DOCUMENTS

| | | |
|---|---|---|
| CN | 108476406 | 8/2018 |
| CN | 109561485 | 4/2019 |
| CN | 109951877 | 6/2019 |
| CN | 110463335 | 11/2019 |
| CN | 110603855 | 12/2019 |
| WO | 2017/171598 | 10/2017 |
| WO | 2018/205150 | 11/2018 |
| WO | 2021/159307 | 8/2021 |

* cited by examiner

NETWORK SLICE AWARE CELL SELECTION

BACKGROUND

A user equipment (UE) may connect to a network that includes network slicing. Generally, network slicing refers to a network architecture in which multiple end-to-end logical networks run on a shared physical network infrastructure. Each network slice may be configured to serve a particular purpose. For example, the network may include a network slice configured to provide carrier services (e.g., voice, multimedia messaging service (MMS), Internet, etc.), a network slice configured to provide machine-type communications (MTC) services, a network slice configured to provide ultra-reliable low latency communications (URLLC) services, etc. Thus, each network slice may share network resources but facilitate different functionality.

To establish a connection to the network and perform the full scope of functionalities normally available to the UE via the network connection, the UE may camp on a cell of the network. Under conventional circumstances, the UE is not aware of whether a cell supports a particular network slice when the UE selects a cell to camp on. As a result, the UE may camp on a cell that does not support a network slice that the UE is configured to utilize.

SUMMARY

According to some exemplary embodiments a method is performed at a user equipment (UE). The method includes receiving information indicating that a cell of a network supports a network slice, identifying that the UE is located within the coverage area of the cell, determining whether measurement data corresponding to the cell satisfies predetermined criteria and when the measurement data satisfies the criteria, the UE camps on the cell.

Further exemplary embodiments include a user equipment (UE) that includes a transceiver and a processor. The transceiver is configured to communicate with a network. The processor configured to perform operations including receiving information indicating that a cell of a network supports a network slice, identifying that the UE is located within the coverage area of the cell, determining whether measurement data corresponding to the cell satisfies predetermined criteria, and when the measurement data satisfies the criteria, the UE camps on the cell.

Still further exemplary embodiments include an integrated circuit. The integrated circuit includes circuitry configured to receive information indicating that a cell of a network supports a network slice, circuitry configured to identify that a user equipment (UE) is located within the coverage area of the cell, circuitry configured to determine whether measurement data corresponding to the cell satisfies predetermined criteria and circuitry configured to cause the UE to camp on the cell when the measurement data satisfies the criteria.

DETAILED DESCRIPTION

Figure 1:
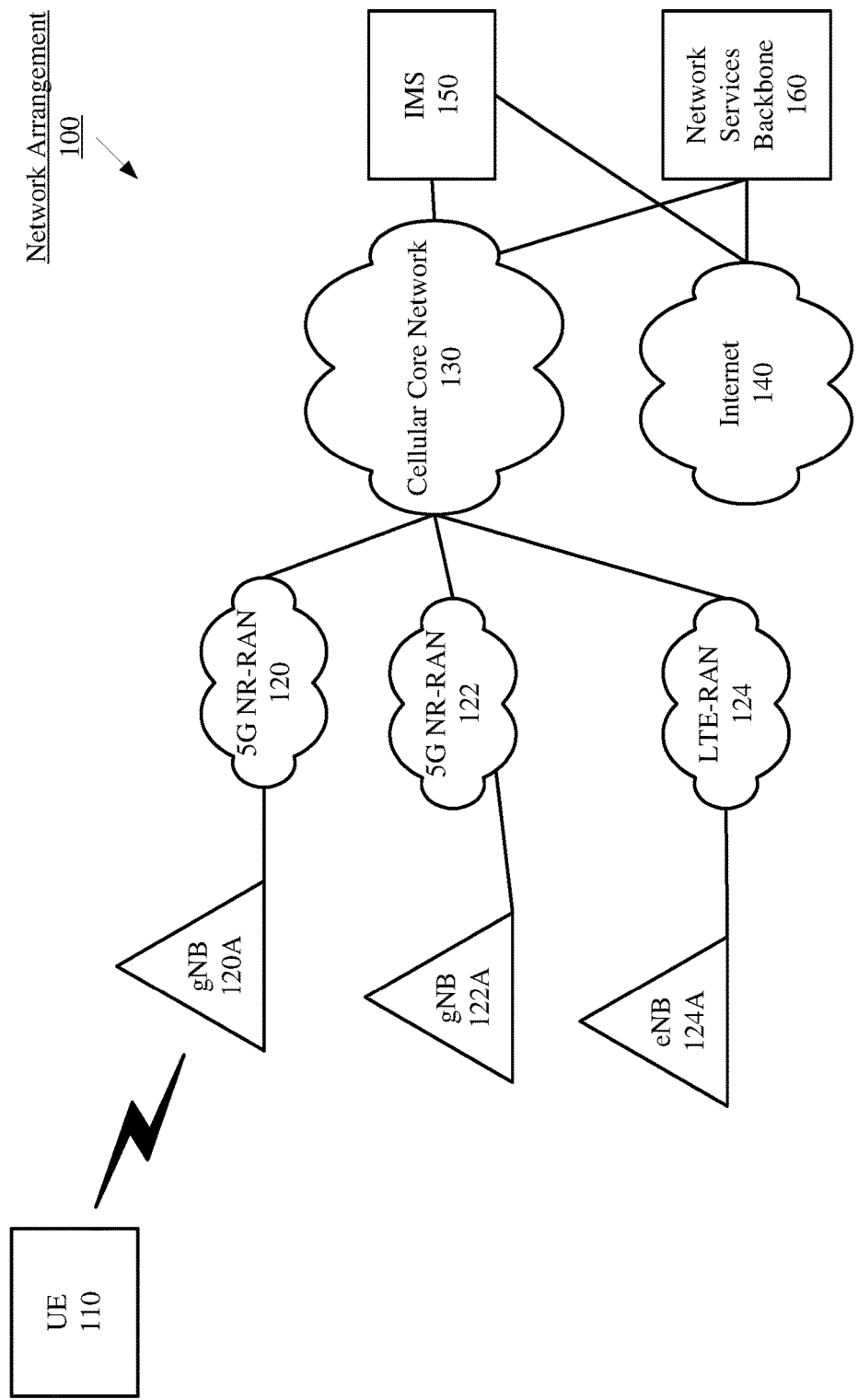
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing network slice aware cell selection at a user equipment (UE). As will be described below, various exemplary mechanisms may be configured to provide the UE with information regarding which cells and/or frequency bands support access to a particular network slice. This network slice information may then be considered by the UE when selecting a cell on which to camp.

The exemplary embodiments are described with regard to the UE. However, reference to a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a fifth generation (5G) network that includes network slicing. Generally, network slicing refers to a network architecture in which multiple end-to-end logical networks run on a shared physical network infrastructure. Each network slice may be configured to provide a particular set of capabilities and/or characteristics. Thus, the physical infrastructure of the 5G network may be sliced into multiple virtual networks, each configured for a different purpose.

Those skilled in the art will understand that 5G may support use cases such as enhanced mobile broadband (eMBB), massive machine type communication (mMTC) and ultra-reliable low latency communication (URLLC). Each of these types of use cases may relate to various different types of applications and/or services. A network slice may be characterized by a type of use case, a type of application and/or service or the entity that provides the application and/or service via the network slice. However, any example in this description that characterizes a network slice in a specific manner is only provided for illustrative purposes. Throughout this description, reference to a network slice may represent any type of end-to-end logical network that is configured to serve a particular purpose and implemented on the 5G physical infrastructure.

The UE may be configured to perform any of a wide variety of different tasks. Thus, the UE may be configured to utilize one or more network slices. For example, the UE may utilize a first network slice for carrier services (e.g., voice, multimedia messaging service (MMS), Internet, etc.) and another network slice for a service provided by a third-party. To provide an example, the third-party may be the manufacturer of the UE that provides services such as, but not limited to, messaging, streaming multimedia, video calls, etc. In another example, the third-party may be an entity managing a digital platform (e.g., social media, e-commerce, streaming media, etc.). In a further example, the third-party may be an entity providing services for Internet of Things (IoT) devices.

As indicated above, a network slice may serve a wide variety of different purposes. However, the configured purpose of a network slice is beyond the scope of the exemplary embodiments. Thus, the exemplary embodiments are not limited to any particular type of network slice. Instead, the exemplary embodiments relate to the UE accessing a particular network slice via a radio access network (RAN).

Slice isolation is one aspect of network slicing. This generally means that the performance of one network slice is not to have an impact on the performance of another network slice. To achieve slice isolation, the network may configure a particular network slice to only be accessed via one or more particular frequency bands. For instance, the radio spectrum allocated to 5G includes frequency range 1 (FR1) (e.g., 410 megahertz (MHz) to 7125 MHz) and frequency range 2 (FR2) (e.g., 24250 MHz to 52600 MHz). In one exemplary deployment scenario, an eMMB slice may be accessed in 2.6 gigahertz (GHz) and 4.9 GHz while an URLLC slice may be accessed in 4.9 GHZ. In another exemplary deployment scenario, the lower frequency bands may be used for mMTC network slices while the higher frequency bands may be used for eMBB network slices. Thus, to access a particular network slice, the UE may camp on a cell of the 5G network. If the cell operates on a frequency band that is configured to provide access to a particular network slice, the UE may access the network slice via the cell. If the cell does not operate on the frequency band, the UE may be unable to access the network slice via the cell.

During operation, the UE may be located near multiple cells deployed with overlapping coverage areas. For instance, a first 5G RAN may include a first cell that supports communication over frequency band (x) and a second 5G RAN may include a second cell that supports communication over frequency band (y). In this example, frequency band (x) may provide access to network slice (a) and frequency band (y) may provide access to network slice (b). When the UE is in coverage of both the first cell and the second cell, the UE may perform registration with either the first 5G RAN or the second 5G RAN. However, under conventional circumstances, the UE is not aware of whether a network slice is supported by a cell until the UE requests to access the slice and the request is either accepted or rejected by the network. Thus, a scenario may arise in which the UE is configured to utilize network slice (a) but decides to camp on the second cell of the second 5G RAN. Since the second cell operates on frequency band (y), the UE will not be able to utilize network slice (a) via the second cell.

The exemplary embodiments relate to implementing network slice aware cell selection at the UE. As will be explained in more detail below, network slice aware cell selection may include the UE receiving information from any of a variety of different sources regarding which one or more network slices are supported by a particular cell and/or frequency band. In some embodiments, this network slice information may be considered by the UE during cell selection or any other procedure in which the UE is directly or indirectly selecting a cell to camp on. In other embodiments, this network slice information may trigger the UE to search for a different cell to camp on.

Various exemplary sources of network slice information will be described in detail below. Some exemplary embodiments are described with regard to collecting network slice information from information broadcast by a cell. Other exemplary embodiments are described with regard to gathering network slice information from information received during a registration procedure. Further exemplary embodiments relate to gathering network slice information from information received from radio resource control (RRC) signaling. These exemplary sources of network slice information and other exemplary sources of network slice information will be described in more detail below. The exemplary embodiments described herein may be used with currently implemented techniques for cell selection, future implementations of techniques for cell selection or independently from other cell selection techniques.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, eMTC devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are 5G New Radio (NR) radio access networks (5G NR-RAN) 120, 122 and a LTE-RAN 124. However, it should be understood that the UE 110 may also communicate with other types of networks (e.g. legacy cellular network, WLAN, etc.) and the UE 110 may also communicate with networks over a wired connection. With regard to the exemplary embodiments, the UE 110 may establish a connection with the 5G NR-RAN 120, the 5G NR-RAN 122 or the LTE-RAN 124.

The 5G NR-RANs 120, 122 and the LTE-RAN 124 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The 5G NR-RANs 120, 122 may include architecture that is capable of providing both 5G NR RAT and LTE RAT services. For example, a next-generation radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC). Thus, reference to the 5G NR-RANs 120, 122 and the LTE-RAN 124 are only provided for illustrative purposes, the exemplary embodiments may apply to any appropriate type of RAN.

Returning to the exemplary network arrangement 100, the UE 110 may connect to the 5G NR-RAN 120 via the next generation Node B (gNB) 120A, the 5G NR-RAN 122 via gNB 122A and the LTE-RAN 124 via the eNB 124A. Those skilled in the art will understand that any association procedure may be performed for the UE 110 to connect to the 5G NR-RAN 120, the 5G NR-RAN 122 or the LTE-RAN 124. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5 g NR-RAN 120). Similarly, for access to the 5G NR-RAN 122 the UE 110 may associate with gNB 122A and for access to the LTE-RAN 124, the UE 110 may associate with the eNB 124A.

In addition to the 5G NR-RANs 120, 122, and the LTE-RAN 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation/traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
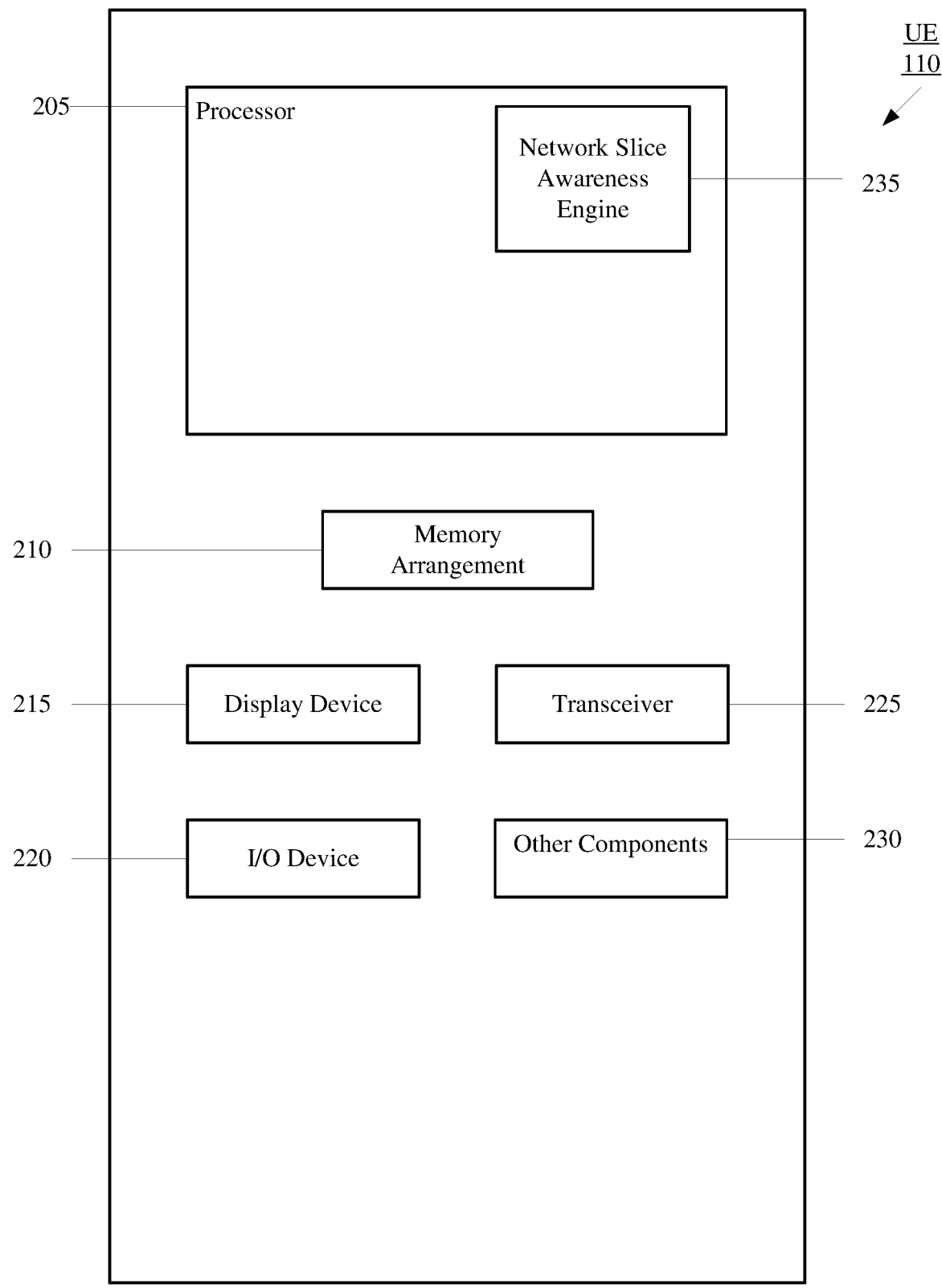
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 110 to other electronic devices, sensors to detect conditions of the UE 110, etc.

The processor 205 may be configured to execute a plurality of engines for the UE 110. For example, the engines may include a network slice awareness engine 235. The network slice awareness engine 235 may be configured to gather information from any of a variety of different sources that indicates which networks slices are supported by a particular cell and/or frequency band. This information may then be considered by the UE 110 during cell selection or any other procedure in which the UE 110 directly or indirectly selects a cell to camp on.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RANs 120, 122, the LTE-RAN 124 and other types of wireless networks. Accordingly, the transceiver 225 may operate on a variety of different frequencies or channels (e.g., set of consecutive frequencies).

Figure 3:
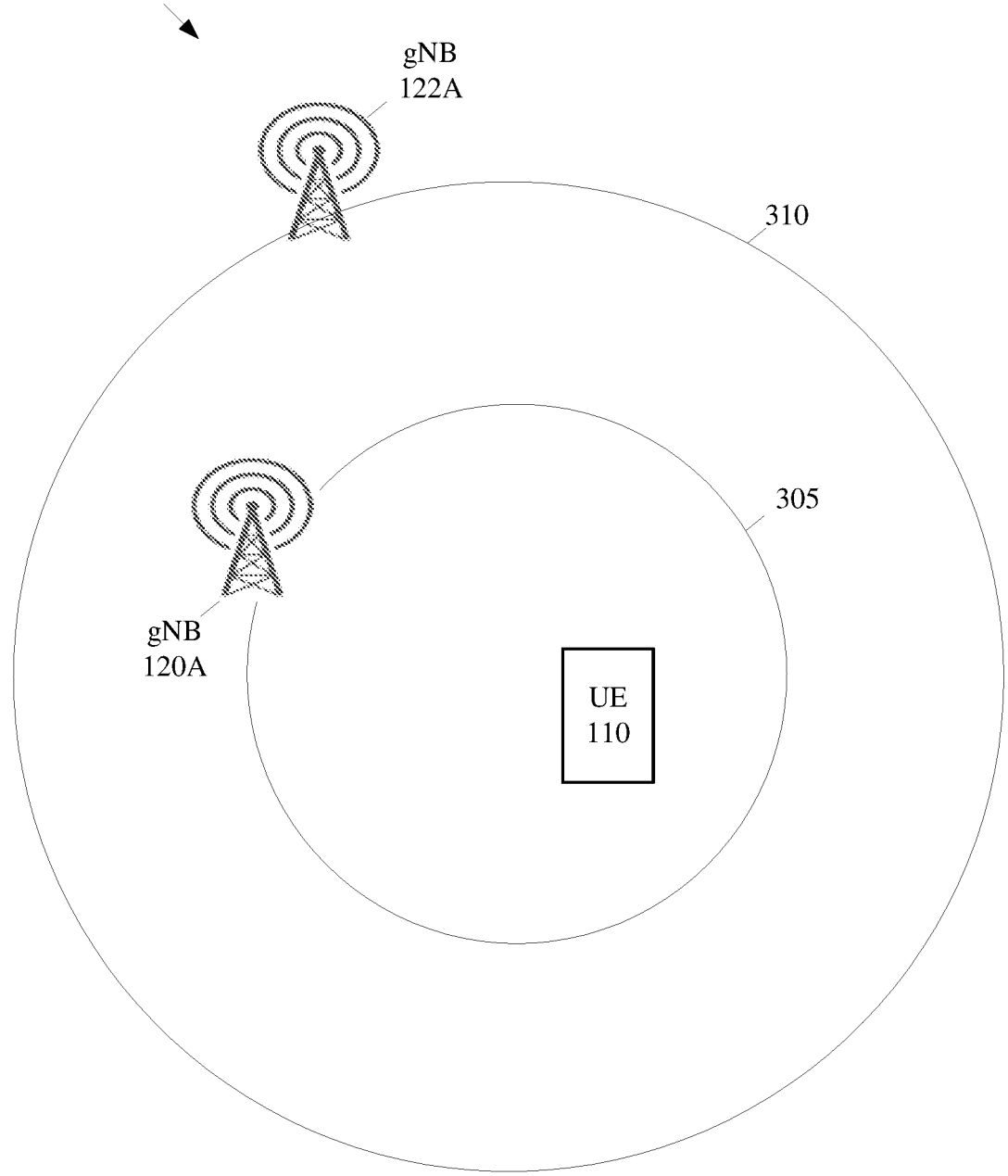
FIG. 3 shows an exemplary scenario in which the UE is located near multiple cells deployed with overlapping coverage areas.

FIG. 3 shows an exemplary scenario 300 in which the UE 110 is located near multiple cells deployed with overlapping coverage areas. The exemplary scenario 300 includes the UE 110, the gNB 120A and the gNB 122A.

The exemplary scenario 300 shows the gNB 120A with a coverage area 305 and the gNB 122A with a coverage area 310. The UE 110 is shown as being located within both the coverage areas 305, 310. As indicated above, the gNB 120A corresponds to the 5G NR-RAN 120 and the gNB 122A corresponds to the 5G NR-RAN 122.

Consider an exemplary set of circumstances in which the 5G NR-RAN 120 operates on a frequency band (y) via the gNB 120A and the 5G NR-RAN 122 operates on a frequency band (x) via the gNB 122A. The frequency band (y) is configured to provide access to a first type of network slice and the frequency band (x) is configured to provide access to a second type of network slice. Since the UE 110 is located within both coverage areas 305, 310, the UE 110 may camp on either the gNB 120A or the gNB 122A. Under conventional circumstances, the UE 110 is not aware that frequency band (y) provided by the gNB 120A is configured to provide access to a first type of network slice and the frequency band (x) provided by the gNB 122A is configured to provide access to a second type of network slice. Thus, the network slice information corresponding to each gNB 120A, 122A would not be considered by the UE 110 when selecting a cell to camp on.

The exemplary embodiments relate to collecting information regarding which network slices are supported by particular cells and/or frequency bands. This information may then be considered by the UE 110 during cell selection or any other instance in which the UE 110 directly or indirectly selects a cell to camp on. For example, with regard to the exemplary scenario 300, the UE 110 may collect and store information from a network component and/or previous interactions with these cells and/or frequency bands. This information may indicate that frequency band (y) provided by the gNB 120A is configured to provide access to a first type of network slice and the frequency band (x) provided by the gNB 122A is configured to provide access to a second type of network slice. Thus, unlike conventional approaches, the UE 110 is aware of network slice information corresponding to these cells and/or frequency bands. As a result, the UE 110 may consider the network slice information during cell selection or any other procedure in which the UE 110 directly or indirectly selects a cell to camp on.

Figure 4:
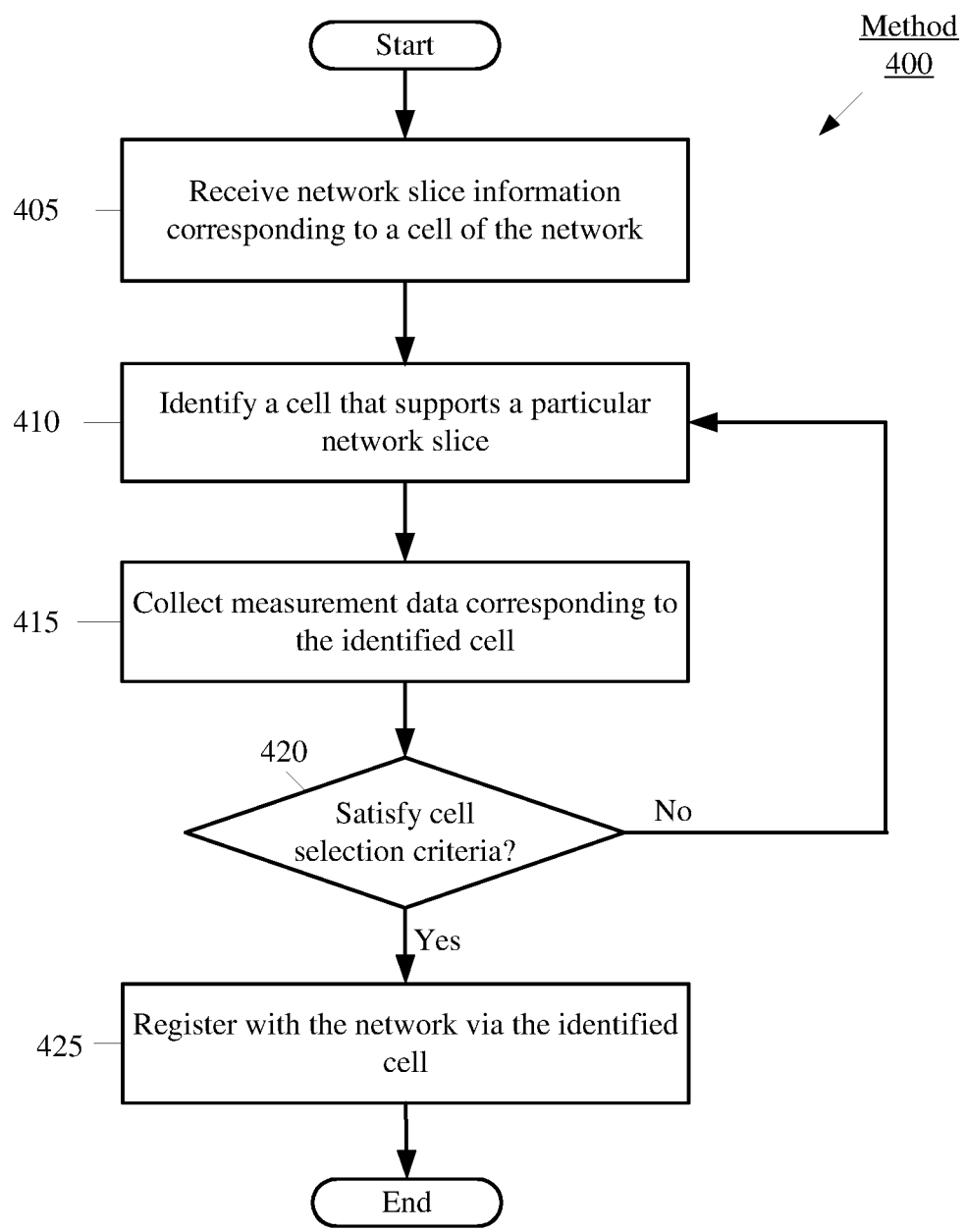
FIG. 4 shows an exemplary method for network aware cell selection according to various exemplary embodiments.

FIG. 4 shows an exemplary method 400 for network aware cell selection according to various exemplary embodiments. The method 400 will be described with regard to the exemplary scenario 300 of FIG. 3, the UE 110 of FIG. 2 and the network arrangement 100 of FIG. 1.

In 405, the UE 110 receives network slice information from the network. The network slice information may indicate whether a particular network slice is supported by a particular cell and/or frequency band. In one aspect, the UE 110 may consider the slice information to determine whether the UE 110 is to remain on a currently camped cell or search for a different cell to camp on. For example, the UE 110 may receive network slice information corresponding to a cell after the UE 110 is already camped on that particular cell. In another aspect, the UE 110 may consider the network slice information during cell selection, cell reselection or any other procedure in which the UE 110 directly or indirectly selects a cell to camp on. For example, at a first location and at a first time, the UE 110 may receive network slice information. The UE 110 may then move to a second location that does not include any of the cells associated with the first location. When the UE 110 returns to the first location, the UE 110 may consider the network slice information when determining which cell to camp on. The network slice information and the variety of different sources of the network slice information will be described in more detail below.

One exemplary source of network slice information may include a system information block (SIB). Those skilled in the art will understand that various different types of SIBs are broadcast by cells. Throughout this description, any reference to a particular SIB is only provided for illustrative purposes. The exemplary embodiments may apply to network slice information being included in any appropriate SIB.

In some embodiments, a 5G NR cell may broadcast an indication of a set of network slices supported by the cell. For example, consider a scenario in which the UE 110 is camped on the gNB 120A and within the coverage area of the gNB 122A. The UE 110 may tune its transceiver 225 and listen for SIBs broadcast by either the gNB 120A or the gNB 122A.

A 5G cell may broadcast a SIB 1 or SIB 2 that includes a single network slice selection assistance information (s-NSSAI) list. Each s-NSSAI may correspond to a different network slice and the s-NSSAI list may indicate whether the corresponding network slices are supported by the cell that broadcast the SIB. Throughout this description, s-NSSAI refers to a single network slice and NSSAI may generally refer to one or more network slices.

Each s-NSSAI may include the slice service type (SST) and a slice descriptor (SD). The SST may identify the type of use case, application and/or service relevant to the corresponding network slice. The SD may identify any one or more entities associated with the network slice. For example, the SD may indicate an owner or an entity that manages the network slice (e.g., carrier) and/or the entity that the is providing the application/service via the network slice (e.g., a third-party, the entity that provides the application or service, etc.). In some embodiments, the same entity may own the slice and provide the service (e.g., carrier services).

As mentioned above, an s-NSSAI may be encoded with both the SST and the SD. In one example, this encoding may take up to forty bits. In another exemplary embodiments, to reduce the number of bits sent over the air, the s-NSSAIs may be configured to include only the SST. Based on the SST information, the UE 110 may make an informed decision on whether to remain on the currently camped cell or reselect to a neighbor cell.

In other exemplary embodiments, a 5G NR cell may provide an on-demand SIB that is configured to indicate a set of network slices supported by the cell and/or its neighbor cells. For example, consider a scenario in which the UE 110 is camped on the gNB 120A. The UE 110 may send a request to the gNB 120A for the SIB as part of an RRC system information request. The UE 110 may be triggered to make this request due to entering a new tracking area, moving to a new public land mobile network (PLMN) or moving from FR1 to FR 2 (or vice versa). In response, the gNB 120A may broadcast one or more SIBs that indicate a set of s-NSSAIs supported by the gNB 120A and/or a set of s-NSSAIs supported by neighbor cells of the gNB 120A.

In further embodiments, a 5G NR cell may broadcast an indication of a set of network slices supported by a neighbor cell. For example, consider a scenario in which the UE 110 is camped on the gNB 120A. The gNB 120A may broadcast a SIB 4 that includes a s-NSSAI list. The s-NSSAI list may indicate a network slice supported by a neighbor cell of the gNB 120A. If there is more than one neighbor cell, the broadcast may include an indication of a set of network slices supported by each neighbor cell.

In other embodiments, an LTE cell may broadcast an indication of a set of network slices supported on a 5G neighbor frequency. For example, consider a scenario in which the UE 110 is camped on the eNB 124A. The eNB 124A may broadcast a SIB 24 that includes a s-NSSAI list. The s-NSSAI list may indicate which network slices are supported by one or more 5G neighbor frequencies. The UE 110 may consider this information when performing reselection from a currently camped LTE cell to a 5G NR cell. As will be described below, the UE 110 may consider the network slice information broadcast by the cells when determining whether to remain on the currently camped cell and/or selecting (directly or indirectly) a cell to camp on.

Another exemplary source of network slice information may include a non-access stratum (NAS) registration procedure. The UE 110 may perform NAS registration per registration area. During NAS registration, the UE 110 may include s-NSSAI information indicating which network slices the UE 110 may attempt to access. In response, the network may inform the UE 110 that the s-NSSAI requested by the UE 110 is allowed or rejected on the currently camped cell in the registration accept message.

Throughout this description, a network slice (or its s-NSSAI) may be characterized as "allowed" or "rejected." Generally, this refers to a scenario in which the UE 110 indicates to the network that the UE 110 is configured to utilize a particular network slice and in response, the network indicates that the particular network slice can be accessed from the currently camped cell (e.g., allowed) or cannot be accessed from the currently camped cell (e.g., rejected). Thus, these terms may refer to feedback from the network regarding whether a network slice is accessible from a currently camped cell or as described below a set of cells corresponding to NAS registration area.

The registration accept message may be configured to provide network slice information in addition to the allowed/rejected designation. In some embodiments, the registration accept message may be configured to further include a Boolean indicator (e.g., true/false) that indicates whether each allowed s-NSSAI is supported in the entire registration area. If a particular allowed s-NSSAI is associated with a true value, the UE 110 may assume that at least some cells in the current registration area support access to that corresponding network slice. If a particular allowed s-NSSAI is associated with a false value, the UE 110 may assume that at least some cells in the current registration area do not support access to that corresponding network slice. A similar indicator may be used to indicate whether each rejected s-NSSAI is not allowed in the entire registration area. For example, if a particular rejected s-NSSAI is associated with a true value, the UE 110 may assume that all cells in the current registration area do not support access to the corresponding network slice. If a particular rejected s-NSSAI is associated with a false value, the UE 110 may assume that one or more cells in the current registration area support access to the corresponding network slice.

In other embodiments, the registration accept message may be configured to indicate the supported frequency range for each allowed s-NSSAI. For example, the indication may indicate to the UE 110 that the allowed s-NSSAI is supported by FR1 only, FR2 only or both FR1 and FR2. In further embodiments, the registration accept message may be configured to include a set of cell IDs and/or registration areas that indicate which s-NSSAIs are allowed or rejected by the corresponding cell ID or registration area.

As will be described below, the UE 110 may determine to proactively move (e.g., after registration accept is received) to a cell that supports a particular s-NSSAI. For example, the UE 110 may prioritize a particular network slice. If the UE 110 identifies from the NAS registration accept message that the currently camped cell does not support the prioritized network slice, the UE 110 may attempt to camp on a different cell that supports the prioritized network slice. Similarly, when a new traffic flow is launched that maps to a s-NSSAI that is not supported by the currently camped cell, the UE 110 may proactively initiate a procedure locally to camp on a different cell that operates on a frequency range that supports the s-NSSAI associated with the new traffic flow.

To provide an example of moving to a different cell based on new traffic flow consider the following exemplary scenario in which the UE 110 is located within the coverage area of three different cells. In this example, the first cell supports network slice A, the second cell supports network slices A and B and the third cell supports network slice B. Initially, the UE 110 is camped on the first cell and has an active data transfer for an application served by network slice A. Subsequently, a new application flow is launched which maps to network slice B. Since the first cell does not support network slice B, the UE 110 may be triggered to move to a different cell that supports network slice B. In this example, the UE 110 may camp on the second cell because it supports both network slice A and B. Thus, the data transfer for the application served by network slice A and the traffic flow for the application that maps to network slice B may both be supported when camped on the second cell. Accordingly, when the UE 110 is selecting a cell to camp on, the UE 110 may consider whether multiple network slices are supported.

Another exemplary source of network slice information may include radio resource control (RRC) signaling. During RRC connection establishment, the UE 110 may include s-NSSAI information indicating which network slices the UE 110 may attempt to access. In response, the UE 110 may receive an indication as to whether the s-NSSAIs are allowed or rejected on the currently camped cell.

In one embodiment, the network slice information may be included in an RRC rejection message. For example, consider a scenario in which the UE 110 is camped on the gNB 120A. Initially, the UE 110 mays send an RRC connection request to the gNB 120A. This may include NSSAI information indicating which one or more network slices the UE 110 may utilize. If the gNB 120A cannot support a network slice indicated by the UE 110, the gNB 120A may send an RRC rejection message to the UE 110. In the RRC rejection message, the network may use a cause code to indicate that a requested s-NSSAI is not supported on the gNB 120A.

In other embodiments, continuing with the example provided above, if the gNB 120A does not support one or more of the network slices indicated by the UE 110, the gNB 120A may initiate an RRC connection release procedure. The gNB 120A may also provide a set of 5G frequencies where the requested network slices are supported. Using network slice information, the UE 110 may then target a cell that operates on the indicated frequencies for a reselection procedure.

Similarly, in another example, if multiple network slices are requested by the UE 110 and none of the requested network slices are supported on the currently camped cell, the gNB 120A may initiate a connection release procedure. For each slice requested by the UE 110, the gNB 120A may indicate a set of 5G frequencies where the network slice is supported. Based on which network slice has the highest priority for the UE 110, the UE 110 may initiate a reselection procedure and target a cell that operates on a frequency corresponding to the highest priority network slice.

Another exemplary source of network slice information may include messages explicitly requesting supported network slices. For instance, consider a scenario in which the UE 110 is camped on the gNB 120A. In one example, the UE 110 may be configured to send an RRC request to the gNB 120A for a set of s-NSSAIs supported on the currently camped cell. In response, the gNB 120A may provide a list of supported s-NSSAIs. In another example, the UE 110 may provide a list of s-NSSAIs and request that the gNB 120A indicate whether the gNB 120A supports one or more of the s-NSSAIs included in the list. In a further example, a NAS layer message may be used. The UE 110 may send a request for supported s-NSSAIs per registration area to the access and mobility management function (AMF). In response, the AMF may indicate which s-NSSAIs are allowed and/or rejected for the registration area. In another example, the UE 110 may provide a set of s-NSSAIs and request that the AMF indicate whether one or more of the indicated s-NSSAIs are supported for the registration area.

Another exemplary source of network slice information may include a cause code. For example, when the UE 110 initiates a packet data unit (PDU) session establishment procedure by indicating a particular s-NSSAI and the network does not support interworking with that s-NSSAI, the session management function (SMF) may send a cause code indicating that interworking with the requested s-NSSAI is not supported by the currently camped RAN. This cause code may be included in a PDU session establishment rejection message.

Another exemplary source of network slice information may include information collected by the UE 110 during operation in the network. For example, during operation the UE 110 may identify mappings between a 5G cell ID and its allowed s-NSSAIs. Similarly, the UE 110 may identify mappings between frequency ranges (or frequency bands) and their allowed s-NSSAIs. In some embodiments, as indicated above, the information collected by the UE 110 may be saved locally at the UE 110. In other embodiments, the UE 110 could provide this information to a server hosted by a third-party. The network slice information provided by the UE 110 and other UEs may be collected to generate a crowd sourced data base of cell IDs and/or frequencies and their corresponding network slices. When the UE 110 registers with a PLMN and/or camps on a particular cell, the UE 110 may reference this database (stored locally or hosted by the third-party) to make an informed decision as to whether traffic for a particular network slice may be initiated on the currently camped cell.

Another exemplary source of network slice information may include a network slice management function (NSSF) running on the core network 130. For example, the NSSF may maintain an association between which cell IDs in a particular PLMN support access to a particular network slice. An AMF or a 5G NR-RAN may take the NSSF assistance information into account while providing feedback to the UE 110 about the supported NSSAIs on the current call and/or tracking area.

In 410, the UE 110 identifies a cell that supports a particular network slice. The UE 110 may identify this cell using information collected from any of the exemplary sources mentioned above or any other appropriate source. As indicated above, in some embodiments, this cell may be identified while the UE 110 is currently camped on a different cell. Thus, the UE 110 may target the identified cell for a reselection procedure. In other embodiments, this cell may be identified during a cell selection procedure.

While reference has been made to cell selection and cell reselection the exemplary embodiments are not limited to these procedures. For example, the UE 110 may attempt to cause the network to perform a handover by selectively providing measurement data corresponding to the identified cell. The exemplary embodiments may apply to any instance in which the UE 110 is directly or indirectly selecting a cell to camp on.

In 415, the UE 110 collects measurement data corresponding to the identified cell. In 420, the UE 110 determines whether the identified cell satisfies selection criteria. For example, in accordance with cell selection or cell reselection, the UE 110 may compare the measurement data to a predetermined threshold. Thus, while the UE 110 may consider whether a cell supports a particular network slice when selecting a cell to camp on, whether or not the UE 110 actually camps on the cell may be determined by normal cell selection or reselection criteria.

If the identified cell does not satisfy the selection criteria, the method 400 may return to 410 where the UE 110 identifies another cell that supports the particular network slice. If the identified cell satisfies the selection criteria, the method 400 continues to 425. In 425, the UE 110 registers with the network via the identified cell. Subsequently, the UE 110 may access the particular network slice and the method 400 ends.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a user equipment (UE):
transmitting, during a non-access stratum (NAS) registration for a registration area, single network slice selection assistance information (s-NSSAI) information indicating multiple network slices the UE is permitted to attempt to access;
receiving information in a NAS registration accept message from a network indicating whether each network slice of the multiple network slices is allowed or rejected for a set of cells in the registration area, wherein the NAS registration accept message further comprises a Boolean indicator for each network slice of the multiple network slices;
determining that a first network slice of the multiple network slices is rejected and not supported by at least one cell of the set of cells based on the NAS registration accept message;
wherein when a first Boolean indicator for the first network slice is associated with a true value, the first network slice is not supported by the set of cells in the registration area;
wherein when the first Boolean indicator for the first network slice is associated with a false value, the first network slice is supported by at least one cell in the set of cells in the registration area;
identifying that the UE is located within the coverage area of a first cell of the set of cells;
determining whether measurement data corresponding to the first cell satisfies predetermined criteria; and
when the measurement data satisfies the criteria, camping on the first cell.

2. The method of claim 1, further comprising:
receiving network slice information in a system information block (SIB).

3. The method of claim 2, wherein the SIB includes information for a currently camped cell and one or more neighbor cells.

4. The method of claim 2, wherein the SIB is broadcast by a further cell, wherein the cell and the further cell are associated with different radio access technologies (RATs).

5. The method of claim 2, wherein the SIB is broadcast by the cell in response to a request sent by the UE.

6. The method of claim 1, wherein the NAS registration accept message includes an indication of whether a network slice is supported by tracking area identities in the registration area.

7. The method of claim 1, wherein the NAS registration accept message includes an indication of one or more frequency ranges associated with an allowed network slice.

8. The method of claim 1, wherein the information is received from a network function of the core network or a remote database hosted by a third-party.

9. A user equipment (UE), comprising:
a transceiver configured to communicate with a network; and
a processor configured to perform operations, the operations comprising:
generating, for transmission during a non-access stratum (NAS) registration for a registration area, single network slice selection assistance information (s-NSSAI)

information indicating multiple network slices the UE is permitted to attempt to access;
receiving information in a NAS registration accept message from network indicating whether each network slice of the multiple network slices is allowed or rejected for a set of cells in the registration area, wherein the NAS registration accept message further comprises a Boolean indicator for each network slice of the multiple network slices;
determining that a first network slice of the multiple network slices is rejected and not supported by at least one cell of the set of cells based on the NAS registration accept message;
wherein when a first Boolean indicator for the first network slice is associated with a true value, the first network slice is not supported by the set of cells in the registration area;
wherein when the first Boolean indicator for the first network slice is associated with a false value, the first network slice is supported by at least one cell in the set of cells in the registration area;
identifying that the UE is located within the coverage area of a first cell of the set of cells;
determining whether measurement data corresponding to the first cell satisfies predetermined criteria; and
when the measurement data satisfies the criteria, camping on the first cell.

10. The UE of claim 9, the operations further comprising:
receiving network slice information in a system information block (SIB) and wherein the SIB is broadcast by one of the cell, a neighbor cell associated with a same radio access technology (RAT) or a further cell associated with a different RAT.

11. The UE of claim 9, wherein the information is received from a network function or a remote database hosted by a third-party.

12. An integrated circuit, comprising:
circuitry configured to generate, during a non-access stratum (NAS) registration for a registration area, single network slice selection assistance information (s-NSSAI) information indicating multiple network slices the UE is permitted to attempt to access;
circuitry configured to receive information in a NAS registration accept message from a network indicating whether each network slice of the multiple network slices is allowed or rejected for a set of cells in the registration area, wherein the NAS registration accept message further comprises a Boolean indicator for each network slice of the multiple network slices;
determining that a first network slice of the multiple network slices is rejected and not supported by at least one cell of the set of cells based on the NAS registration accept message;
wherein when a first Boolean indicator for the first network slice is associated with a true value, the first network slice is not supported by the set of cells in the registration area;
wherein when the first Boolean indicator for the first network slice is associated with a false value, the first network slice is supported by at least one cell in the set of cells in the registration area;
circuitry configured to identify that a user equipment (UE) is located within the coverage area of a first cell of the set of cells;
circuitry configured to determine whether measurement data corresponding to the first cell satisfies predetermined criteria; and
circuitry configured to cause the UE to camp on the first cell when the measurement data satisfies the criteria.

13. The integrated circuit of claim 12, further comprising:
circuitry configured to receive network slice information in a system information block (SIB) and wherein the SIB is broadcast by one of a neighbor cell associated with a same radio access technology (RAT) or a further cell associated with a different RAT.

14. The integrated circuit of claim 12, wherein the information is received from a network function of the core network or a remote database hosted by a third-party.

* * * * *